(12) United States Patent
Faseler (10) Patent No.: US 10,712,181 B2
(45) Date of Patent: Jul. 14, 2020

(54) INSTRUMENT ENCLOSURE

(71) Applicant: Brad Faseler, Houston, TX (US)

(72) Inventor: Brad Faseler, Houston, TX (US)

(73) Assignee: Brad Faseler, Houston, TX (US)

( * ) Notice: Subject to any disclaimer, the term of this patent is extended or adjusted under 35 U.S.C. 154(b) by 200 days.

(21) Appl. No.: 15/920,128

(22) Filed: Mar. 13, 2018

(65) Prior Publication Data

US 2018/0283910 A1 Oct. 4, 2018

Related U.S. Application Data

(60) Provisional application No. 62/481,680, filed on Apr. 4, 2017.

(51) Int. Cl.
*G01D 11/24* (2006.01)
*G01D 11/26* (2006.01)
*G01D 11/30* (2006.01)
*G01L 19/14* (2006.01)

(52) U.S. Cl.
CPC .......... *G01D 11/245* (2013.01); *G01D 11/26* (2013.01); *G01D 11/30* (2013.01); *G01L 19/142* (2013.01); *G01L 19/143* (2013.01)

(58) Field of Classification Search
CPC ...... G01D 11/24; G01D 11/245; G01D 11/30; G01L 19/142; G01L 19/143; G01R 1/04
USPC ................. 73/431, 756; 220/4.01, 4.02, 475
See application file for complete search history.

(56) References Cited

U.S. PATENT DOCUMENTS

| | | | |
|---|---|---|---|
| 3,731,534 A * | 5/1973 | Painley | G01F 15/14 73/273 |
| 4,033,191 A | 7/1977 | Kreuz et al. | |
| 4,080,527 A * | 3/1978 | Volling | F16L 5/10 174/667 |
| 4,135,688 A | 1/1979 | England | |
| 4,219,773 A | 8/1980 | Markfelt | |
| 4,249,227 A | 2/1981 | Kato | |
| 4,315,432 A | 2/1982 | Newton | |
| 4,392,539 A | 7/1983 | Fujii et al. | |
| 4,401,941 A | 8/1983 | Cunningham et al. | |
| 4,472,680 A | 9/1984 | Wellington | |
| 4,597,291 A | 7/1986 | Motomiya | |
| 4,869,105 A | 9/1989 | Hartmann et al. | |
| 4,920,799 A | 5/1990 | Low | |
| 5,115,263 A | 5/1992 | Bernhardt et al. | |
| 5,214,245 A | 5/1993 | Bernhardt et al. | |
| 5,426,562 A | 6/1995 | Morehouse et al. | |

(Continued)

*Primary Examiner* — Benjamin R Schmitt
(74) *Attorney, Agent, or Firm* — Jackson Walker L.L.P.

(57) ABSTRACT

An instrument enclosure includes top and bottom sections, the bottom section having a first part fastened to a second part, and hinges hinging the top and bottom sections to enable the top section to rotate between a close positioned and an open position. When closed, the instrument enclosure defines an enclosed space suitable for receiving a field instrument. The bottom section may be fastened to a standpipe or to a bracket fastened to the standpipe. The bottom section may define an opening configured to receive the standpipe and/or an opening to receive process line tubing carrying process line signals to the field instrument. The field instrument may be affixed to an end portion of the standpipe received in the enclosed space, removably attached to an interior of the instrument enclosure, or affixed to a mounting plate attached to the standing pipe.

15 Claims, 4 Drawing Sheets

(56) References Cited

U.S. PATENT DOCUMENTS

| | | | |
|---|---|---|---|
| 5,471,666 A | | 11/1995 | Sugiyama et al. |
| 5,531,130 A | * | 7/1996 | Welker ................. G01N 1/2035 73/863.11 |
| 5,547,095 A | | 8/1996 | Sonntag et al. |
| 5,641,086 A | | 6/1997 | Sonntag et al. |
| 5,646,823 A | | 7/1997 | Amori |
| 5,750,924 A | | 5/1998 | Sonntag et al. |
| 5,913,447 A | | 6/1999 | Carpenter |
| 6,231,819 B1 | | 5/2001 | Morello |
| 6,469,626 B1 | | 10/2002 | Hung |
| 6,921,141 B1 | | 7/2005 | Porco |
| 2002/0109978 A1 | | 8/2002 | Henry |
| 2004/0011125 A1 | | 1/2004 | Kozawa et al. |
| 2004/0042192 A1 | | 3/2004 | Davidson et al. |
| 2006/0176653 A1 | | 8/2006 | Davidson et al. |
| 2008/0165544 A1 | | 7/2008 | Lazarus et al. |
| 2012/0265491 A1 | | 10/2012 | Drummy |
| 2012/0325694 A1 | * | 12/2012 | Thompson ............. B65D 81/38 206/216 |
| 2015/0133979 A1 | | 5/2015 | Johnson |
| 2016/0150669 A1 | | 5/2016 | Weber |
| 2017/0074691 A1 | | 3/2017 | Baird et al. |

* cited by examiner

INSTRUMENT ENCLOSURE

RELATED APPLICATION

This application claims priority to U.S. provisional application No. 62/481,680, filed Apr. 4, 2017, the entirety of which is incorporated by reference herein.

BACKGROUND

In fields of endeavor pertaining to petrochemical plants, refining facilities, upstream production of oil and gas, power plant generation, and other applicable fields, instruments are frequently employed to monitor or sense pressure, flow, temperature, and other process parameters. Frequently, such instruments are required and/or configured to operate out of doors, often in remote or otherwise isolated locations and these instruments may be referred to herein as field instruments. Instrument enclosures may be used to protect instruments, including field instruments.

Conventional instrument enclosures include standard-sized rigid enclosures and customized, removable, soft cover enclosures. Conventional rigid enclosures are not generally suitable for enclosing field instruments that are directly attached to a standpipe or the like. When a field instrument is to be enclosed with a conventional rigid enclosure, the field instrument is first affixed within the instrument enclosure and the enclosure, rather than the field instrument, is attached to the standpipe. Many mounting brackets may be required to arrange the instrument into the rigid box in such a way that allows the instrument enclosure to be opened and closed.

Soft removable covers, often used in warmer climates to wrap around mounted instruments, tubing or tubing bundles, and power and communication wiring, are often closed using either metal rings or extended straps of fabric from the cover itself, which in turn are typically equipped with Velcro. The metal rings may be used to run the strap through the ring and back to a matching Velcro section to secure the strap. To install a soft removable cover, a custom installer is generally required to go to a site, where the installer may have to be escorted from instrument to instrument, and build a custom template to accommodate the instrument body, the manifold to which it is mounted, any necessary holes for both tubing or tubing bundle carrying the process fluid to the instrument, and any power or communication wiring. Due to their high degree of customization, these soft removable covers are often extremely difficult to re-install properly once removed for maintenance or any other reason. As a result, once they are removed from the instrument, these soft removable covers with one-of enclosure mechanisms are frequently not re-installed at all, or are not re-installed correctly, leaving the instrument exposed to the ambient conditions.

SUMMARY

Disclosed instrument enclosures address problems that may arise with typical rigid or soft cover enclosures. Disclosed instrument enclosures allow for a field instrument that is mounted directly to a standing structure, such as a conventional 2" standpipe or the like, to be enclosed, in the field, within an enclosed space defined by the instrument enclosure, thereby beneficially enabling contractors to improve their productivity during original installation and eliminate the practice of providing expensive and often proprietary instruments to a box manufacturer and then waiting for the assembled instrument and instrument enclosure assemblies to arrive back at the site to then be installed. Disclosed instrument enclosures save time during original installation because disclosed instrument enclosures do not require mounting all components and the field instrument to the instrument enclosure and then mounting the instrument enclosure on the standpipe or other structure. Disclosed instrument enclosures may be replaced without taking the field instrument offline and the time required to replace disclosed instrument enclosures is much less than time required to replace conventional rigid enclosures.

With respect to soft removable cover enclosures, disclosed instrument enclosures provide at least the following advantages: Disclosed instrument enclosures can be mounted directly to a supporting structure, like the field instrument itself, and will allow direct access to the field instrument without having to completely remove a custom fitted cover. Disclosed instrument enclosures are more likely to be replaced properly should a replacement be required whereas the soft removable covers are difficult to re-install properly once they have been removed from the field instrument, due to their custom fitted profiles. Disclosed instrument enclosures may reduce or eliminate expensive travel and the tedious process of walking around the applicable facility to first locate each instrument and then creating a custom template. Disclosed instrument enclosures can also be used for covering inline instruments, valves, regulators, and other appurtenances that would need to maintain a specified thermal profile.

Disclosed field-mounted instrument enclosures, including rigid and semi-rigid enclosures, protect field instruments from ambient conditions by providing a barrier between the enclosed space and the environment external to the enclosed space. The barrier shields the enclosed space from one or more environmental elements including, as non-limiting examples and depending on the embodiment, precipitation, humidity, wind, sunlight, environmental debris, wild animals, and unauthorized persons. Embodiments may employ seals, gaskets, or the like using known materials such as silicon or silicon based compounds to improve the moisture barrier provided by the instrument enclosure in the closed position. Embodiments allow a universally-sized box to completely enclose a field instrument without taking the field instrument off-line, removing the field instrument from a standpipe mount, or mounting the field instrument within an instrument enclosure using various brackets.

Disclosed instrument enclosures may include a top section, also sometimes referred to herein as a hinged section, and a bottom section, also referred to herein as a fixed section. The bottom section may include two parts, which may be hinged or affixed in a manner that permits the bottom to be opened and wrapped around a field instrument or other object mounted to a pipe or a standpipe. The two parts of the bottom section may be configured to wrap around a portion of the standpipe or other support, a portion of the tubing or tubing bundle carrying a process fluid, and a portion of any power wire(s) and/or communication wire(s) fixed to the field instrument. Disclosed instrument enclosures may further include a hinge or fastening means which is suitable for attaching the top section of the instrument enclosure to the bottom section once the bottom section is in place.

Accordingly, subject matter disclosed herein includes an instrument enclosure comprising a top section, a bottom section including a first part and a second part, one or more fasteners for fastening the first part to the second part, and one or more hinges configured to hinge the top section to the bottom section. The bottom section may be suitably configured to readily attach directly to a standpipe or directly to a bracket that is affixed to the standpipe. In at least one embodiment, the hinges enable the top section to rotate, relative to the bottom section, wherein an angle formed by an edge of the top section and a corresponding edge of the section varies between 0 degrees in the closed position and N degrees in the open position where N can vary between 90 to 270 in some embodiments and N can vary between two different angles in other embodiments. In the closed position, edges of the top section are in contact with or in very close proximity to corresponding edges of the bottom section, and the combination of the top section and the bottom section define an enclosed space that is suitable for receiving a field instrument.

The first part of the bottom section may define a first notch and the second part of the bottom section may define a second notch. The first notch and the second notch may be positioned and sized wherein the combination of the first notch and the second notch define an opening in the bottom section when the first part is fastened to the second part. The opening in the bottom section may comprise an opening in a central portion of a base plate formed by the combination of a base portion of the first part and a base portion of the second part. The opening in the bottom section may be sized and otherwise configured to engage a standpipe, in which case an end portion of the standpipe may reside within the enclosed space defined by the top and bottom sections of the instrument enclosure in the closed position. In these embodiments, the field instrument, when installed, may be affixed to the end portion of the standpipe and the enclosed space is suitably sized to receive the field instrument affixed to the end portion of the standpipe.

One or more interior surfaces of enclosed space defined by the instrument enclosure, including but not limited to one or more interior surfaces of the bottom section, may include one or more instrument attachment elements to which one or more attachment elements or features of the field instrument may attach. In at least some embodiments, the attachment elements may be sufficient in number, position, strength, and other relevant parameters to fully support the field instrument. In such embodiments, the standpipe may terminate outside of the instrument enclosure and the enclosed space may not need to accommodate an end portion of the standpipe. In these embodiments, the instrument enclosure may be configured to attach to a mounting plate, bracket, or other suitable structure that is itself, affixed to the standpipe.

In some embodiments, one or more openings in the bottom section may be configured to receive one or more process line conduits for carrying, communicating, or otherwise conveying one or more measurable process parameters to the field instrument. Such conduits may be enclosed in suitable process line tubing. In still other embodiments, the instrument enclosure may include a first opening configured to receive a standpipe and a second opening configured to receive one or more process line conduits and, in these embodiments, the standpipe opening may be located in a different surface of the instrument enclosure. As a non-limiting example, the standpipe opening may be disposed in a horizontally oriented lower surface while the conduit opening is disposed in a vertically oriented reward surface of the instrument enclosure.

In embodiments of the instrument enclosure that include a first opening for a standpipe and a second opening for one or more process line conduits, the first part of the bottom section may include or define a first pipe notch and a first line notch while the second part of the bottom section may include or define a second pipe notch and a second line notch. In these embodiments, the first pipe notch and the second pipe notch may be positioned, sized, and otherwise configured wherein the combination of the first pipe notch and the second pipe notch define the standpipe opening when the first part and the second part are properly fastened together while the first line notch and the second line notch are positioned, sized, and otherwise configured wherein the combination of the first line notch and the second line notch define the process line opening when the first part and the second part are properly fastened together.

In some instrument enclosure embodiments, including embodiments that lack a pipe opening, the bottom section may be configured to be fastened to a mounting plate or bracket that is affixed or that is readily affixed to the standpipe. In such embodiments, the mounting plate or bracket may include a plurality of openings suitable for receiving bolt, screws, pins, or other suitable fasteners, in which case, the bottom section of the instrument enclosure may include a corresponding plurality of openings for receiving said bolts, screws, pins, or other suitable fasteners.

In some embodiments, the instrument enclosure is a convex polyhedral instrument enclosure comprising a plurality of planar or substantially planar surfaces or walls. Convex polyhedral embodiments of the instrument enclosure may include hexahedral embodiments, comprising six planar surfaces including an upper surface and a lower surface that are oriented in parallel or substantially parallel planes, a forward surface and a rearward surface that are oriented in parallel or substantially parallel planes that are perpendicular or substantially perpendicular to the upper surface, and a left surface and a right surface that are oriented in parallel or substantially parallel planes that are perpendicular or substantially perpendicular to the upper surface and the forward surface.

In some hexahedral embodiments, the top section of the instrument enclosure includes the upper surface, the forward surface, a first portion of the left surface, and a first portion of the right surface while the bottom section includes the lower surface, the rearward surface, a second portion of the left surface and a second portion of the right surface. In these embodiments, the first part of the bottom section may include a first portion of the lower surface, a first portion of the rearward surface, and the second portion of the left surface while the second part of the bottom section may include a second portion of the lower surface, a second portion of the rearward surface, and the second portion of the right surface.

The first and second parts of the bottom section may be configured as mirror images of one another or substantially so. The first portion of the lower surface may comprise a first half of the lower surface while the second portion of the lower surface may comprise a second half of the lower surface. Similarly, the first portion of the rearward surface may comprise a first half of the rearward surface and the second portion of the rearward surface may comprise a second half of the rearward surface.

Embodiments of the instrument enclosure, including embodiments of hexahedral and other convex polyhedral instrument enclosures may include one or more durable and transparent or partially transparent windows of tempered glass or other suitable material.

In further accordance with disclosed subject matter, a disclosed method of providing an instrument enclosure suitable for enclosing a field instrument located at a desired site includes hinging a top section, also referred to herein as the hinged section, of an instrument enclosure to a bottom section, also referred to herein as the standing section, of the instrument enclosure to enable the hinged section to rotate, relative to the standing section, between a closed position and one or more open positions. When the instrument enclosure is in the closed position, the combination of the standing section and the hinged section define an enclosed space that is suitably dimensioned to receive a field instrument and suitably constructed to provide a barrier between the enclosed space and the external environment in which the instrument enclosure is located. The barrier shields the enclosed space from one or more environmental elements.

The method further includes attaching the standing second to a standing structure located at or within the site and affixing the field instrument to a supporting structure such that the field instrument is positioned in a particular position disposed within the enclosed space when the instrument enclosure is closed. The supporting structure may be the standpipe or attachment elements disposed in or on an interior surface of the enclosed space defined by the instrument enclosure in the closed position.

Embodiments of the method support substantially any sequence for hinging the hinged section, attaching the fixed section, and affixing the field instrument to a supporting structure, such that any of the following sequences may be followed: hinging, attaching, and supporting; attaching, hinging, and supporting; supporting, hinging, and attaching; and supporting, attaching, and hinging.

The method may further include forming the fixed section by fastening a first part of the fixed section to a second part of the hinged section. Affixing the field instrument to the supporting structure may include affixing the field instrument to the standing structure, in which case the instrument enclosure may include or define an aperture sized, positioned, and otherwise configured to receive a terminal portion of the standing structure within the enclosed space. Affixing the field instrument may alternatively include attaching the field instrument to one or more attachment features of the instrument enclosure, in which case the fixed portion of the instrument enclosure may be affixed to the standpipe or to a brace, bracket, or mounting plate attached to the standpipe.

The figures and corresponding text disclose non-limiting examples and embodiments. Like reference numerals used in different figures represent like structures or processes unless denoted otherwise. The drawings are not intended to be to scale. Features may be enlarged or reduced relative to other features for clarity, emphasis, or other reasons.

DETAILED DESCRIPTION

Figure 2:
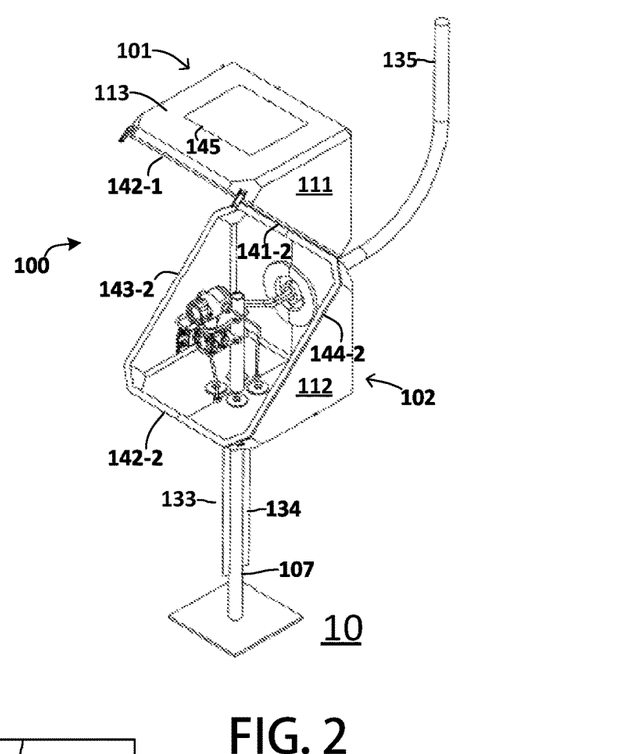
Figure 3:
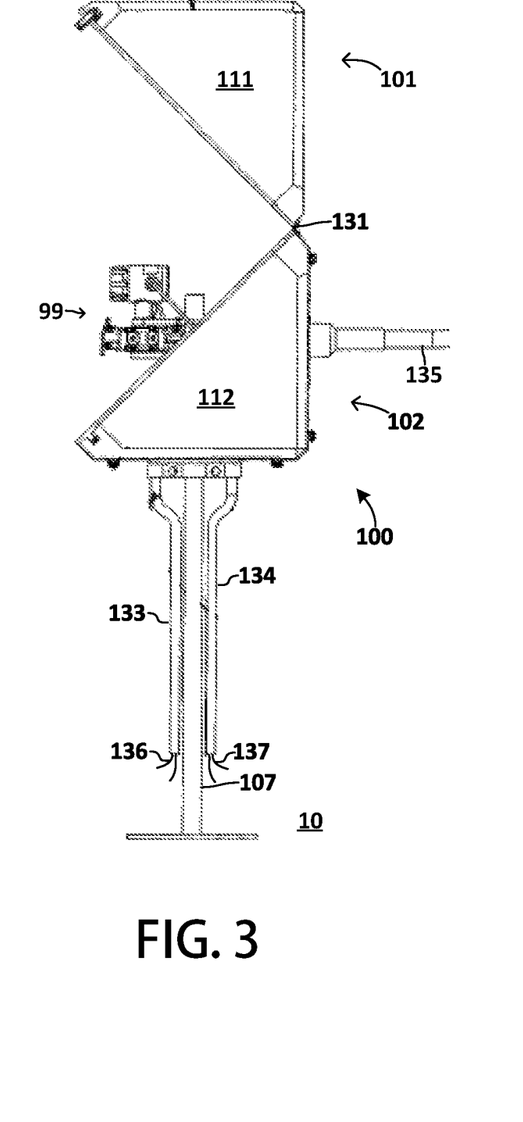
Figure 4:
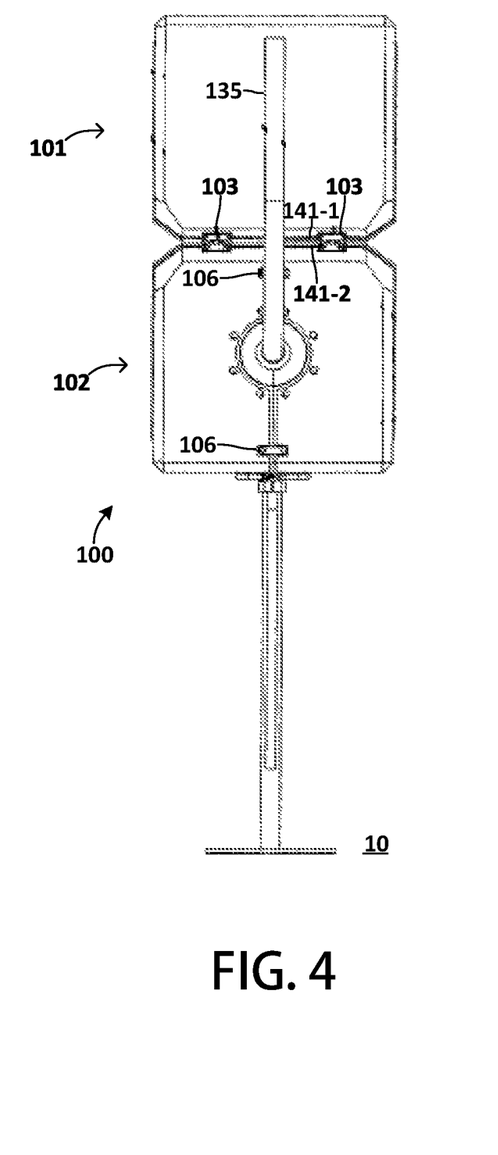

As illustrated in FIG. 2, FIG. 3, FIG. 4, and FIG. 5, instrument enclosure 100 includes a top section 101 and a bottom section 102. The top section 101 and bottom section 102 illustrated in FIG. 2 and FIG. 3 are substantially triangular in cross section as best illustrated by the substantially triangular side panel 111 of top section 101 and the substantially triangular side panel 112 of bottom section 102 shown in FIG. 2. A front panel 113 of top section 101 is illustrated in FIG. 2 with an optional window 145 to enable visual inspection of the instrument enclosure without opening the instrument enclosure. Window 145 may be comprised of tempered glass or any other sufficiently transparent and durable material.

Figure 5:
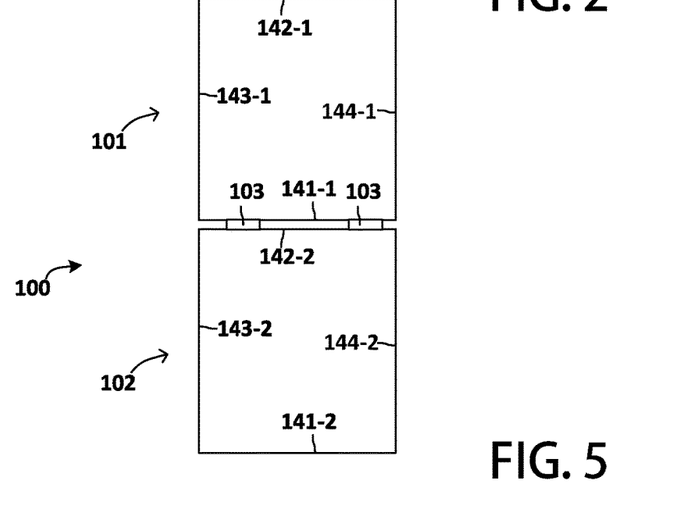

As best illustrated in FIG. 5, which is a front elevation view of instrument enclosure 100 in an open position with all elements within the instrument enclosure omitted for clarity, top section 101 includes first, second, third, and fourth edges 141-1, 142-1, 143-1, and 144-1. Similarly, bottom section 102 includes first, second, third, and fourth edges 141-2, 142-2, 143-2, and 144-2. First edge 141-2 of bottom section 102 may be hinged or otherwise rotatably-affixed to first edge 141-1 of top section 101 via one or more hinges 103 or other suitable attachment means. Hinges 103 may enable top section 101 to rotate around an axis 131 (FIG. 3) between an open position as best shown in FIG. 2 and a closed position (not depicted), in which second, third, and fourth edges 142-1, 143-1, and 144-1, of top section 101 are in contact with or in close proximity to second, third, and fourth edges 142-2, 143-2 and 144-2 of bottom section 102.

Although the figures illustrate hinging between top section 101 and bottom section 102 along first edges 141 of top section 101 and bottom section 102, embodiments of instrument enclosure 100 may include additional hinging between top section 101 and bottom section 102 to enable variations of open and closed configurations of instruction instrument enclosure 100 in addition to the open and closed configurations supported by the illustrated hinging. Such additional hinging may include, without limitation, fixed or detachable hinging between second edges 142, fixed or detach hinging between third edges 143, and fixed or detachable hinging between fourth edges 144.

In the closed position, the top section 101 and bottom section 102 cooperatively define an instrument enclosure space within which a field instrument may be located as described in more detail below. In at least some embodiments, top section 101 and bottom section 102 cooperatively form a cubic or substantially cubic instrument enclosure. In at least some other embodiments, top section 101 and bottom section 102 cooperatively form a rectangular cuboid or substantially rectangular cuboid instrument enclosure.

Figure 1:
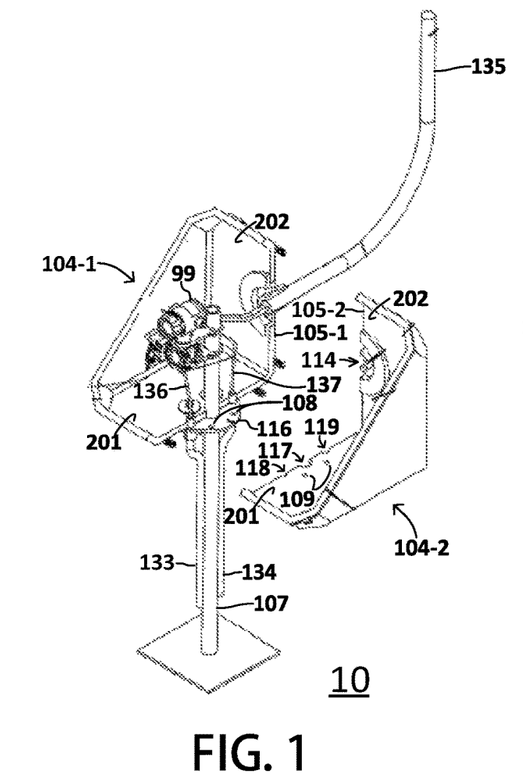
FIG. 1, FIG. 2, FIG. 3, FIG. 4, and FIG. 5 illustrate an instrument enclosure assembly from different perspectives.

The bottom section 102 illustrated in FIG. 1 includes a left half 104-1 distinct and detachable from a right half 104-2. FIG. 2 illustrates the two bottom section halves 104 connected together along respective L-shaped edges 105-1 and 105-2 (best seen in FIG. 1) to form bottom section 102. The bottom section halves 104 may be connected together by one or more fasteners 106 (FIG. 4), which may be implemented as hinged fasteners or as any suitable type of rigid fastener.

FIG. 1 illustrates a bracket 116, mounted or otherwise affixed to a structure sometimes referred to as a standing structure exemplified by a standpipe 107. Each bottom section half 104 of bottom section 102 may include holes 109 that may be located to align with holes 108 in bracket 116 enabling bottom section halves 104 to be affixed to and supported by bracket 116 whenever bracket 116 is affixed to standpipe 107. Each bottom section half 104 includes a first plate 201 and a second plate 202 that is perpendicular or substantially perpendicular to first plate 201.

As illustrated in the figures, first plates 201 are oriented in a substantially horizontal plane while the second plates 202 are oriented in a substantially vertical planes. Each first plate 201 may include or define a notch 117 configured to engage standpipe 107 such that the two bottom section halves 104 may be attached to one another while engaging standpipe 107. Notches 117 may be shaped in accordance with the shape of standpipe 107. For a circular embodiment of standpipe 107, each notch 117 may define a semicircular arc.

The first plates 201 illustrated in FIG. 1 further include or define notches 118, configured to engage tubing 133 enclosing power wires 136, and notches 119, configured to engage tubing 134 enclosing communication wires or fibers 137. The second plates 202 define corresponding notches 114 configured to engage process line tubing 135 such that the second plates 202 may be connected to each other while engaging process line tubing 135, allowing for process line tubing 135 to enter the instrument enclosure. While the notches 114, 117, 118, and 119 are illustrated in FIG. 1 as smooth and continuous arcs, embodiments may incorporate grooves and/or other elements to better restrict or engage the applicable pipes, tubing, or other structural elements.

The bracket 116 may be made of a metal or other suitable material and the bracket 116 may include two halves configured to wrap engage and connect to standpipe 107. Tensioning bolts or the like may be used to secure bracket 116 onto standpipe 107 at a desired height. An field instrument 99 may be mounted to standpipe 107 at a height or position that lies within the instrument enclosure space formed when top section 101 and bottom section 102 are in the previously described closed position. A gasket or other type of sealing structure (not depicted) may be employed to provide additional environmental isolation between the environment and enclosed space defined when the instrument enclosure is closed.

FIG. 1, FIG. 2, FIG. 3, and FIG. 4 illustrate an instrument enclosure assembly 10 that includes a field instrument 99 directly mounted, affixed, or otherwise attached to standpipe 107 or another support structure. In addition, the illustrated field instrument 99 is attached to process line tubing 135 configured to provide a process flow, including a measurable parameter, to field instrument 99. The illustrated instrument enclosure assembly 10 includes a rigid or semi rigid instrument enclosure 100 configurable to be attached to standpipe 107 or bracket 116 such that instrument enclosure 100 encompasses field instrument 99 while permitting ingress/egress for the process line tubing 135.

Thus, the illustrated instrument enclosure 100 is configured for independent attachment to the support and includes three mutually adjustable parts—top section 101, bottom section left half 104-1, and bottom section right half 104-2, structured for removing and replacing the instrument enclosure 100 about a field instrument 99 attached to process line tubing 135 without detaching the field instrument 99 from the standpipe 107 or other support structure or from the process line tubing 135.

Figure 6:
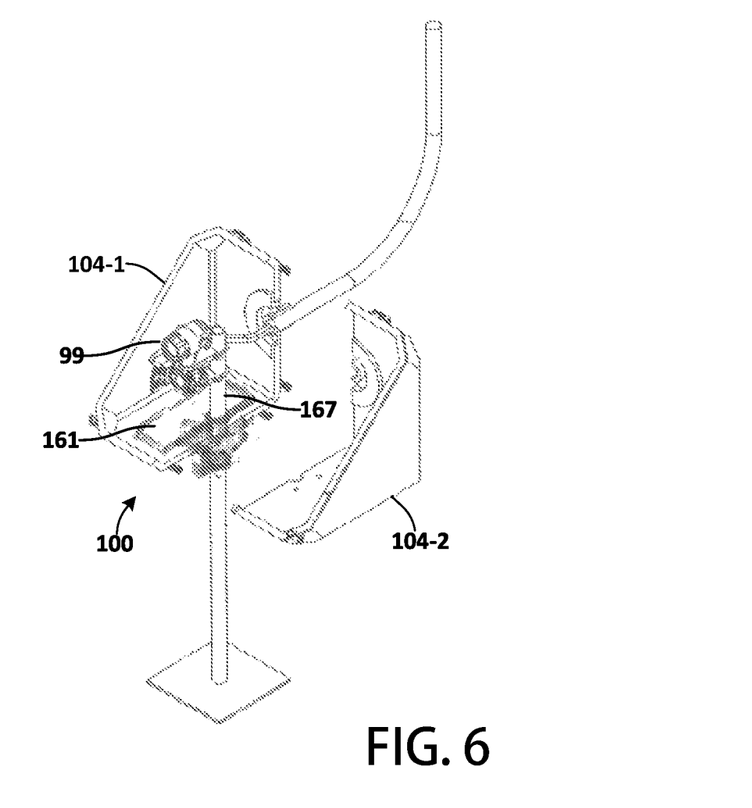
FIG. 6 and FIG. 7 illustrate an instrument enclosure assembly in which an instrument enclosure is attached to a mounting plate affixed to a standpipe or other suitable standing structure.
Figure 7:
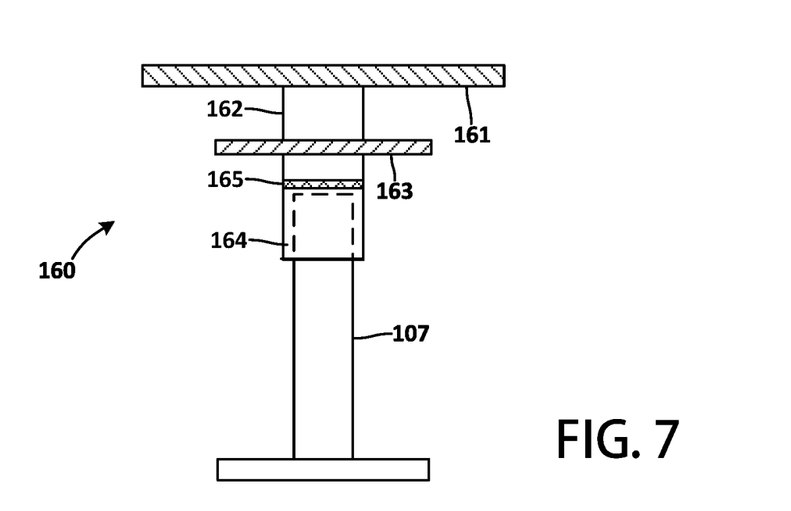

Referring now to FIG. 6 and FIG. 7, an alternative configuration is illustrated. Whereas the field instrument 99 illustrated in FIG. 1 through FIG. 5 is directly attached to a standpipe 107 that extends from the ground into instrument enclosure 100, FIG. 6 and FIG. 7 illustrate a perspective view and a side elevation view of an instrument enclosure assembly 10 that employs a mounting plate assembly 160 that includes a mounting plate 161 affixed to a mounting plate column 162 that terminates in a collar 164 sized and configured to fit securely over or onto a new or existing standpipe 107. In this embodiment, field instrument 99 may be attached to mounting plate 161 or to a column or other member attached to mounting plate 161. The collar 164 of the mounting plate assembly 160 illustrated in FIG. 6 and FIG. 7 terminates in a collar disc 165 that defines the vertical extent to which standpipe 107 may extend into collar 164. FIG. 7 further depicts an instrument enclosure support 163 that forms a collar rigidly or moveable affixed to mounting plate column 162, to which instrument enclosure 100 may be attached, thereby supporting instrument enclosure 100 separately and apart from the support of the field instrument 99.

The mounting plate assembly 160 may include a field instrument column 167 as shown in FIG. 6 that extends from mounting plate 161. In such assemblies, even though field instrument column 167 occupies volume analogous to the volume occupied by standpipe 107 in FIG. 1 through FIG. 5, the mounting plate embodiment illustrated in FIG. 6 beneficially enables pre-field attachment of field instrument 99 to the field instrument column 167, i.e., attachment of instrument to enclosure before the field instrument 99 is brought to the field, thereby potentially greatly easing the burden experienced during installation. In other mounting plate embodiments, the field instrument may be attached directly to the mounting plate 161 thereby achieving the pre-field attachment feature described above for the embodiment depicted in FIG. 7, but also potentially enabling an instrument enclosure with a smaller footprint, an instrument enclosure with more interior space, or both.

Figure 8:
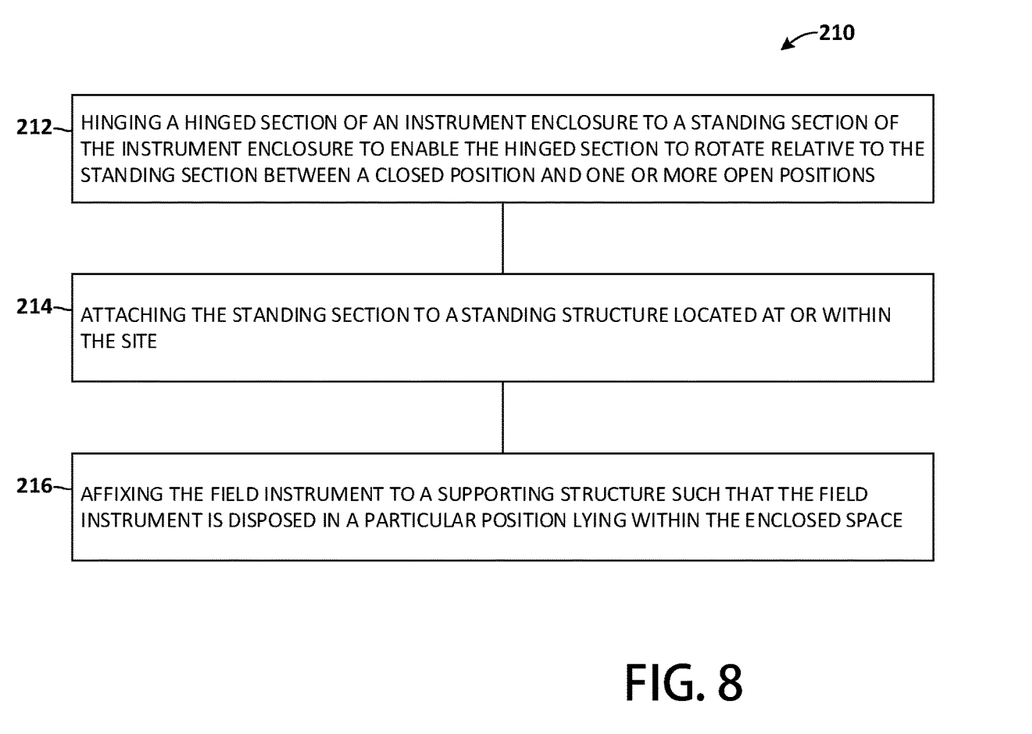
FIG. 8 is a flow diagram of a method of providing an instrument enclosure for a field instrument.

Referring now to FIG. 8, a flow diagram illustrates a method 210 of providing an instrument enclosure suitable for mounting to a standpipe or other type of standing structure located at or within a site and further suitable for enclosing a field instrument. The method 210 illustrated in FIG. 8 includes hinging (operation 212) a hinged section of an instrument enclosure to a standing section to enable the hinged section to rotate, relative to the standing section, between a closed position and one or more open positions. In the closed position, the combination of the standing section and the hinged section define an enclosed space suitably dimensioned to receive the field instrument and suitably constructed to provide a barrier between the enclosed space and the surrounding environment wherein the barrier shields the enclosed space from one or more environmental elements. The method 210 illustrated in FIG. 8 further includes attaching (operation 214) the standing section to a standing structure located at or within the site and supporting (operation 216) the field instrument in a particular position. The particular position lies within the enclosed space when the standing section is attached to the standing structure, the hinged section is hinged to the standing section, and the instrument enclosure is in the closed position. The field instrument may be supported by the standpipe in embodiments in which the field instrument is affixed to the stand pipe. The field instrument may be supported by attachment elements within the instrument enclosure in embodiment in which the bottom section attaches to a mounting plate affixed to the standpipe.

Although FIG. 8 illustrates a particular arrangement of the operations 212, 214, and 216, a beneficial feature of disclosed instrument enclosures is the ability to attach elements of the assembly in different chronological orders. As examples, the attaching (operation 214) of the standing section may occur before or after the hinging (operation 212) of the hinged section to the standing section. Similarly, the field instrument may be supported (operation 214) either before or after the standing section is attached to the standing structure. Forming the standing section may include fastening a first part of the standing section to a second part of the standing section.

Supporting the field instrument may include one or more operations including: attaching the field instrument to the standing structure, wherein the instrument enclosure defines an aperture configured to receive a terminal portion the standing structure and attaching the field instrument to one or more attachment features of the instrument enclosure.

The invention claimed is:

1. An instrument enclosure, comprising:
a top section;
a bottom section comprising a first part and a second part;
one or more fasteners to fasten the first part to the second part; and
one or more hinges configured to hinge the top section to the bottom section, wherein:
the one or more hinges are configured to enable the top section to rotate between a close positioned and one or more open positions;
the top section and the bottom section define an enclosed space in the closed position;
the enclosed space is suitable for receiving a field instrument;
the bottom section is configured to be fastened to a standpipe or to a bracket fastened to the standpipe;
the first part of the bottom section defines a first notch;
the second part of the bottom section defines a second notch; and
the first notch and the second notch are configured to define an opening in the bottom section.

2. The instrument enclosure of claim 1, wherein the opening in the bottom section is configured to engage the standpipe, wherein an end portion of the standpipe resides in the enclosed space.

3. The instrument enclosure of claim 2, wherein:
the field instrument is affixed to the end portion of the standpipe; and
the enclosed space is suitable to receive the field instrument affixed to the end portion of the standpipe.

4. The instrument enclosure of claim 3, wherein:
one or more interior surfaces of the bottom section include one or more instrument attachment elements suitable to removably attach the field instrument to the bottom section; and
the enclosed space is suitable to receive the field instrument removably attached to the bottom section.

5. The instrument enclosure of claim 1, wherein the opening in the bottom section is configured to receive one or more process line conduits configured to convey one or more measurable process parameters to the field instrument.

6. The instrument enclosure of claim 5, wherein:
the one or more process line conduits are enclosed in process line tubing; and
the opening in the bottom section is configured to engage the process line tubing.

7. The instrument enclosure of claim 1, wherein:
the bottom section is configured to be fastened to a bracket affixed to the standpipe;
the bracket includes a plurality of openings suitable for receiving fasteners; and
the bottom section includes a plurality of openings corresponding to the plurality of openings in the bracket.

8. The instrument enclosure of claim 1, wherein, the instrument enclosure comprises a convex polyhedral instrument enclosure.

9. The instrument enclosure of claim 8, wherein the convex polyhedral instrument enclosure comprises a hexahedral instrument enclosure comprising six planar surfaces including an upper surface, a lower surface, a forward surface, a rearward surface, a left surface, and a right surface.

10. The instrument enclosure of claim 9, wherein:
the top section includes the upper surface, the forward surface, a first portion of the left surface, and a first portion of the right surface; and
the bottom section includes the lower surface, the rearward surface, a second portion of the left surface, and a second portion of the right surface.

11. The instrument enclosure of claim 10, wherein:
the first part of the bottom section includes a first portion of the lower surface, a first portion of the rearward surface, and the second portion of the left surface; and
the second part of the bottom section includes a second portion of the lower surface, a second portion of the rearward surface, and the second portion of the right surface.

12. The instrument enclosure of claim 11, wherein:
the first portion of the lower surface comprises a first half of the lower surface;
the second portion of the lower surface comprises a second half of the lower surface;
the first portion of the rearward surface comprises a first half of the rearward surface; and
the second portion of the rearward surface comprises a second half of the rearward surface.

13. The instrument enclosure of claim 9, wherein:
at least one of the planar surfaces includes a transparent and durable window.

14. The instrument enclosure of claim 13, wherein the transparent and durable window comprises a tempered glass window.

15. An instrument enclosure comprising:
a top section;
a bottom section comprising a first part and a second part;
one or more fasteners to fasten the first part to the second part; and
one or more hinges configured to hinge the top section to the bottom section, wherein:
the one or more hinges are configured to enable the top section to rotate between a close positioned and one or more open positions;
the top section and the bottom section define an enclosed space in the closed position;
the enclosed space is suitable for receiving a field instrument;
the bottom section is configured to be fastened to a standpipe or to a bracket fastened to the standpipe;
the first part of the bottom section defines a first pipe notch and a first line notch;
the second part of the bottom section defines a second pipe notch and a second line notch;
the first pipe notch and the second pipe notch are configured to define a standpipe opening in the bottom section;
the standpipe opening is configured to engage the standpipe;
the first line notch and the second line notch are configured to define a process line opening in the bottom section; and
the process line opening is configured to receive process line tubing enclosing one or more process line signals conveying one or more process line parameters to the field instrument.

* * * * *

UNITED STATES PATENT AND TRADEMARK OFFICE
CERTIFICATE OF CORRECTION

PATENT NO.         : 10,712,181 B2
APPLICATION NO.    : 15/920128
DATED              : July 14, 2020
INVENTOR(S)        : Brad Faseler Page 1 of 1

It is certified that error appears in the above-identified patent and that said Letters Patent is hereby corrected as shown below:

On the Title Page

Item (12) "Faseler" should read --Faseler et al.--

Correction of Item (72) Inventorship to include the following inventor:
TAGTOW, Daniel
13304 Broadmeade Ave.
Austin, TX 78729

Signed and Sealed this
Eighth Day of October, 2024

Katherine Kelly Vidal
*Director of the United States Patent and Trademark Office*